(12) United States Patent
Herman et al.

(10) Patent No.: US 7,112,296 B2
(45) Date of Patent: Sep. 26, 2006

(54) METHOD FOR MAKING THIN FUEL CELL ELECTROLYTE

(75) Inventors: Gregory S Herman, Albany, OR (US); Sriram Ramamoorthi, Corvallis, OR (US); Peter Mardilovich, Corvallis, OR (US); Ronald L. Enck, Corvallis, OR (US); J Daniel Smith, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 340 days.

(21) Appl. No.: 10/273,732

(22) Filed: Oct. 18, 2002

(65) Prior Publication Data

US 2004/0076864 A1 Apr. 22, 2004

(51) Int. Cl.
*B29C 39/12* (2006.01)

(52) U.S. Cl. .................. 264/221; 264/219; 264/250; 429/38

(58) Field of Classification Search ............... 29/623.1; 429/13, 16, 30, 32, 33, 38; 264/219, 221, 264/250, 313, 317; 427/115, 264, 265, 271
See application file for complete search history.

(56) References Cited

U.S. PATENT DOCUMENTS 5,269,988 A * 12/1993 Coetzer ............... 264/614
6,805,720 B1 * 10/2004 Yajima et al. ............. 29/623.5
6,833,212 B1 * 12/2004 Jeon et al. .................... 429/30
2003/0232230 A1 * 12/2003 Carter et al. ................. 429/32
2004/0072057 A1 * 4/2004 Beatty et al. ................ 429/38
2004/0076868 A1 * 4/2004 Mardilovich et al. ......... 429/34

FOREIGN PATENT DOCUMENTS

| DE | 19914661 | 10/2000 |
| JP | 2001236970 | 8/2001 |
| WO | WO0045457 | 8/2000 |
| WO | WO02080299 | 10/2002 |

OTHER PUBLICATIONS

Morse J D et al: "A Novel Thin Film Solid Oxide Fuel Cell fro Microscale Energy Conversion" Proceedings of the SPIE, SPIE, Belligham, VA US vol. 3876, Sep. 20, 1999, pp. 223-226.

* cited by examiner

*Primary Examiner*—Angela Ortiz

(57) ABSTRACT

An electrolyte has a core and at least one projection extending from the core. The core is supported on a substrate, and the at least one projection is separated from the substrate.

18 Claims, 15 Drawing Sheets

METHOD FOR MAKING THIN FUEL CELL ELECTROLYTE

FIELD OF THE INVENTION

The invention is in the thin film fuel cell field. The invention particularly concerns thin film electrolytes, thin film structures, thin film fuel cells, electronic devices incorporating thin film fuel cells, and methods for making thin film electrolytes and fuel cells.

BACKGROUND OF THE INVENTION

A fuel cell is an electrochemical device that directly combines a fuel and an oxidant, such as hydrogen and oxygen, to produce electricity and exhaust, such as water. It has an anode or fuel electrode and a cathode or air electrode separated by an electrolyte. Hydrogen is oxidized to protons on the anode with an accompanying release of electrons. At the cathode, molecular oxygen reacts to form oxygen ions, consuming electrons in the process. Electrons flow from the anode to the cathode through an external load, and the circuit is completed by ionic current transport through the electrolyte. Hydrogen fuel cells do not emit toxic gasses. They operate quietly and have a potential efficiency of up to about 80 percent.

A particular class of fuel cells is thin film cells that include a solid electrolyte layer. This type of fuel cell is particularly well suited for applications such as small and microelectronics devices. Generally, the potential power output of a fuel cell varies nearly directly with the useful interface area between the electrolyte and anode and between the electrolyte and cathode. To provide increased output from thin film cells, longer and wider anode, cathode, and electrolyte layers have been provided. Enlarging these layers has required an enlarged footprint for the cells. This is undesirable in microelectronics devices.

Additional problems are known with solid oxide thin film fuel cells. For example, the cells typically require a relatively high operating temperature in the 700–1000° C. range. These high temperatures can lead to delamination problems in thin film cells. In particular, thermal cycling to and from these operating temperatures can cause substantial thermal expansion and contraction of the various fuel cell layers. Because the layers are made of different materials having different coefficients of thermal expansion, they may expand and contract by different amounts. This can cause the layers to come apart from one another.

Solutions to some of these problems have been proposed. For example, it has been proposed to construct cells using anode, cathode, and electrolyte layers having similar coefficients of thermal expansion. This can be difficult, however, since closely matching coefficients of thermal expansion do not necessarily correlate to increased cell performance.

SUMMARY OF THE INVENTION

According to the invention, an electrolyte for use with a thin film fuel cell comprises an electrolyte core that is supported on a substrate. At least one electrolyte projection extends from the core and is suspended over the substrate.

DETAILED DESCRIPTION OF THE INVENTION

Figure 1:
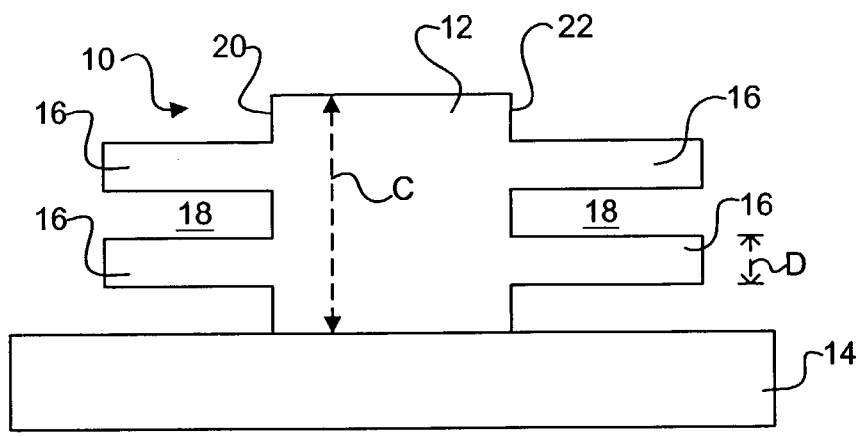
FIG. 1 is side view of an embodiment of an electrolyte of the invention.
Figure 2:
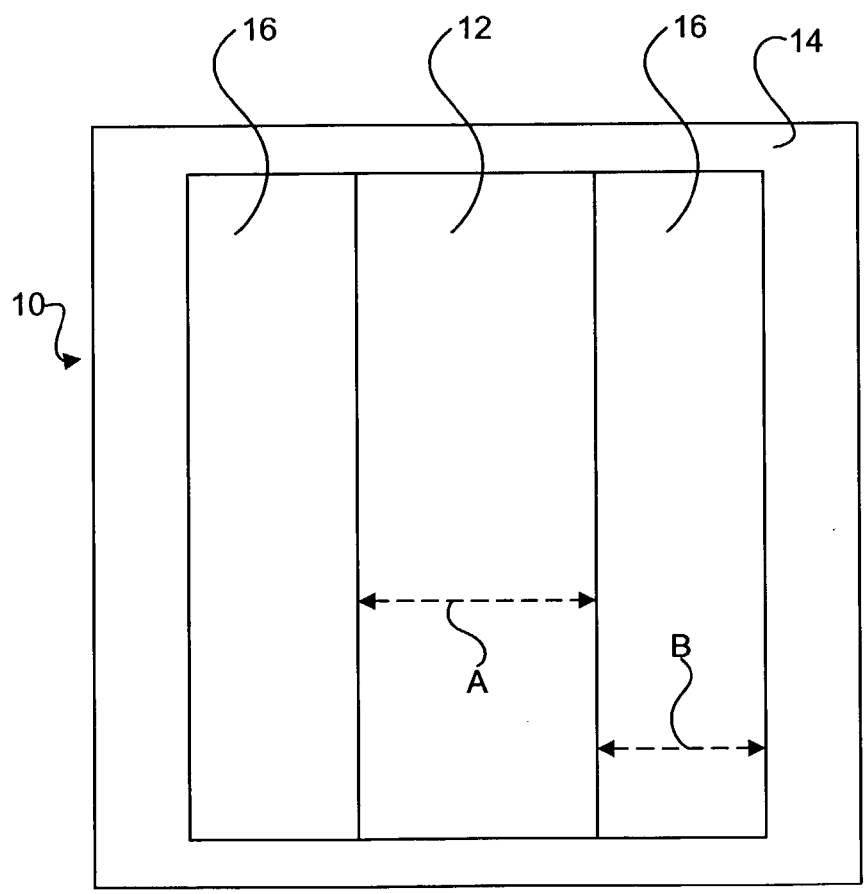
FIG. 2 is a top view of the electrolyte of FIG. 1.

The present invention is directed to thin film fuel cells, electrolytes for thin film fuel cells, electronic devices that include a thin film fuel cell, and methods for making electrolytes and thin film fuel cells. The present invention provides many advantages. For example, the shape of thin film electrolytes achieved through practice of the present invention allows for good mechanical attachment of the layers of a thin film fuel cell, and therefore for improved resistance to delamination. Additionally, increased interlayer surface area provides for relatively high reaction rates, and tortuous structures can be formed that increase the turbulence in the flow field. These and other advantages of the invention will be better appreciated through consideration of the detailed description of exemplary invention embodiments described herein and shown in the drawings. Turning now to the drawings, FIGS. 1 and 2 illustrate a thin film electrolyte embodiment of the invention generally at 10. The electrolyte 10 has a substantially vertical core 12 supported on a substrate 14. The substrate 14 may be conductor that is conductively linked to the core 12, or may be a dielectric. The core 12 has a three-dimensional generally rectangular shape, although the invention could be practiced using cores having a variety of other shapes, with examples including but not limited to circular, elliptical, polygonal, and the like. A plurality of projections 16 is integrally connected to the core 12 and is suspended over the substrate 14. As used herein the term "integrally connected" is intended to broadly refer to being part of the same whole and continuous with.

The projections 16 extend outwards from a generally planar core first side 20 and an opposing generally planar second side 22. The projections 16 are thus supported over the substrate 14, and have gaps 18 defined between them. The projections 16 are shaped in the general form of a three-dimensional rectangle although other shapes can be considered, and are generally wider and thinner than the core 12 to maximize their top and bottom surface areas.

Thin film electrolytes of the invention such as the exemplary electrolyte 10 offer several advantages. For example, the projections 16 provide increased surface area for contact with anodes and cathodes. Furthermore, the projections 16 are beneficial in providing for strong mechanical attachment to an anode and cathode, and to thereby reduce delamination problems. Also, these structures can be arranged in a non-linear configuration to form tortuous paths for the flow of the fuel and oxidants to increase the likelihood of gas/surface interactions.

It will be appreciated that the thin film electrolyte may be made of suitable materials as are generally known in the art. By way of example, if the electrolyte 10 is for use in a solid oxide fuel cell, it may be made of materials such as, by way of example and not limitation, a ceramic such as yttria stabilized zirconia, samaria doped ceria, gadolinia doped ceria, lanthanum strontium gallium maganite, and the like. It will be appreciated that the electrolyte 10 is not limited to use with solid oxide fuel cells, and may be useful in many additional types of cells in which it may be desired to form the electrolyte 10 of a different material. By way of example, the electrolyte 10 (and/or electrolyte support structure) may be useful in any of a protonic ceramic, proton exchange membrane, molten carbonate, alkaline electrolyte or phosphoric acid fuel cells. The core 12 may have a width illustrated as dimension A in FIG. 2 of between about 1 and about 1000 microns. A preferred width is between about 1 and about 250 microns. Each of the projections 16 has a width B as illustrated by FIG. 2 of between about 0.25 and about 1500 microns. The core 12 may have a height C as illustrated by FIG. 1 as small as about 0.25 micron and as large as about 500 microns. Each of the projections 16 preferably has a height illustrated as D in FIG. 1 of between about 1 micron and about 50 microns.

Particular dimensions of the core 12, projections 16, and the substrate 14, including length, may vary depending on a particular application. It may be desirable, for example, to provide an electrolyte 10 shaped and sized to maximize interface area, to maximize reduction of delamination, to form gas channels, and the like. In the exemplary cases of increased surface area and reduced delamination, it may be preferred to use smaller electrolytes 10 with an increased density per unit area as compared to gas channel applications.

With reference to FIG. 2 by way of example, the dimension A may be about 1 micron or less for an electrolyte structure embodiment of the invention useful to increase surface area and reduce delamination, the dimension B being between about 0.25 and about 5 microns for these applications, and the dimension D (FIG. 1) between about 1 micron and about 2 microns. In the exemplary case of forming gas channels, it may be preferred to use larger electrolytes to form larger channels and thereby reduce the restriction on the air and/or fuel flows. For gas channel electrolyte applications, by way of example, the dimension A of FIG. 2 may be about 250 microns, the dimension B about 500 microns, and the dimension D (FIG. 1) about 50 microns.

Figure 3:
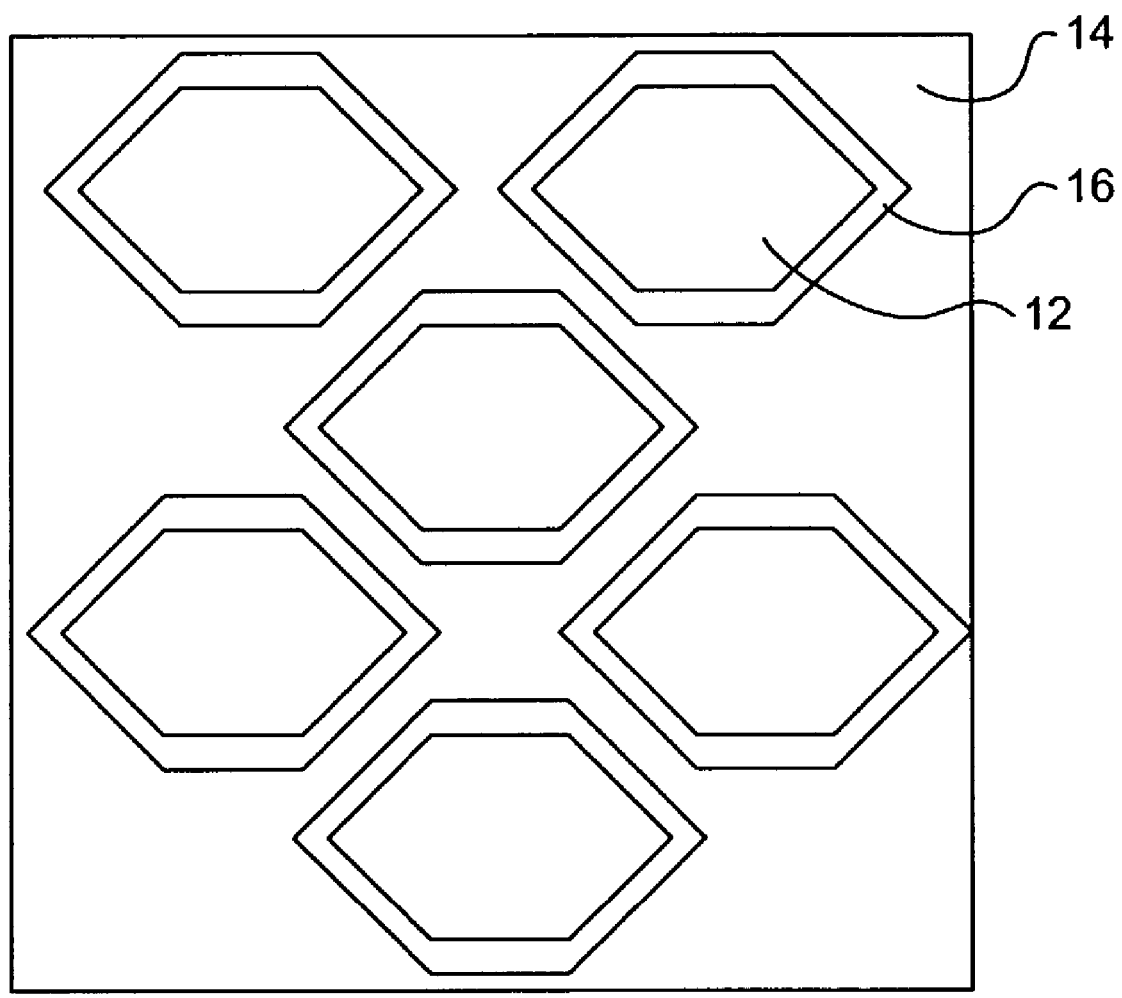
FIG. 3 is a top view of an embodiment of an electrolyte arrangement of the invention.

In addition, other core 12 and projection 16 shapes may be useful for these applications. For example, unconnected square, rectangular, or circular structures may be useful to increase surface area, reduce delamination and increase the turbulence of gas flow past the structures. Indeed, in an additional exemplary embodiment of the invention, a plurality of individual electrolyte structures are provided in a non-linear configuration in order to increase the turbulence of gas flowing past fuel cells that are formed on the electrolyte structures. FIG. 3 is a top plan view illustrating a plurality of generally hexagon-shaped electrolyte cores 12 and projections 16 configured on a substrate 14 in a non-linear arrangement to increase the turbulence of gas flow. It will be appreciated that although common element numbers for describing the cores, projections, and substrate of FIG. 3 have been used with reference to FIGS. 1–2, the projections and cores of FIG. 3 have a different shape than those of FIGS. 1–2. Those knowledgeable in the art will further appreciate that many other shapes and arrangements will be useful for maximizing useful surface area and increasing flow turbulence.

Figure 4:
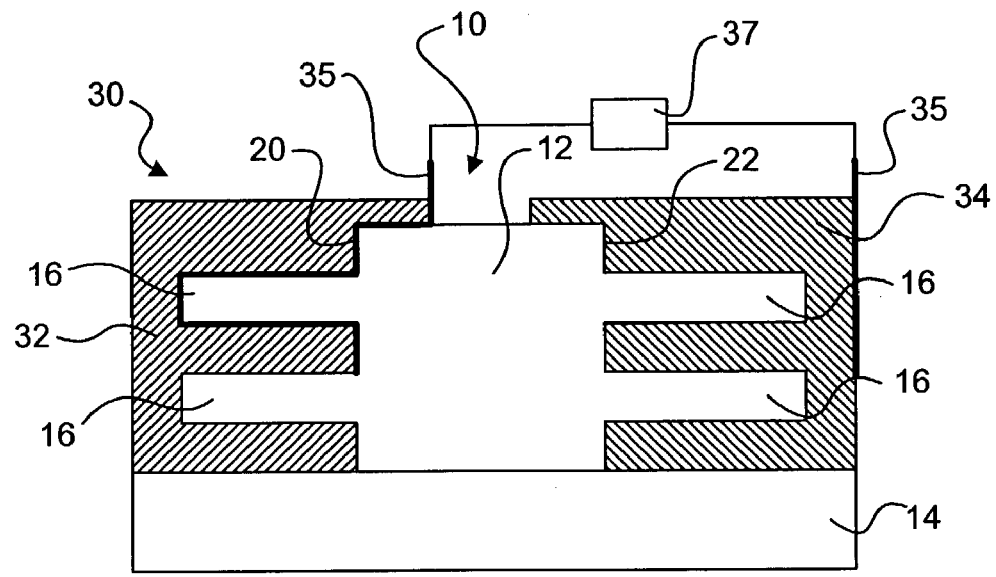
FIG. 4 is side view of an embodiment of a fuel cell of the invention that includes the electrolyte of FIG. 1.

Advantages of electrolytes of the invention will be better appreciated when considering fuel cells embodiments of the present invention. FIG. 4 illustrates a fuel cell shown generally at 30 that includes the exemplary electrolyte 10 of FIGS. 1 and 2. An anode 32 is attached to the first side 20 of the electrolyte and to the plurality of projections 16 that extend from that side. A cathode 34 is attached to the opposing second side 22 and to the plurality of projections 16 extending from that side. The anode 32 and cathode 34 from the same cell are preferably separated from one another, although the anode 32 and cathode 34 of adjacent cells can be connected for stacking purposes. As is generally known in the art, a current collector 35 may be provided to communicate current between the anode 32 and cathode 34 and to an electric load 37 such as a microprocessor or other electronics or microelectronics device. The current collectors 35 shown here are only by way of illustration and many different designs can be considered. Those skilled in the art will also understand that the current collector 35 should not impede the performance of the electrodes, which may be accomplished for instance, by utilizing a porous current collector 35.

It will be appreciated that the anode 32 and cathode 34 enjoy a relatively strong mechanical attachment to the electrolyte 10 as compared to generally flat, layered, electrolytes of the prior art, because of the configuration of the electrolyte 10. In addition, a relatively high surface interface area is achieved between the electrolyte 10 and the anode 32 and cathode 34 while maintaining a relatively small footprint. This provides for relatively-high current output due to the large effective surface area.

Figure 5:
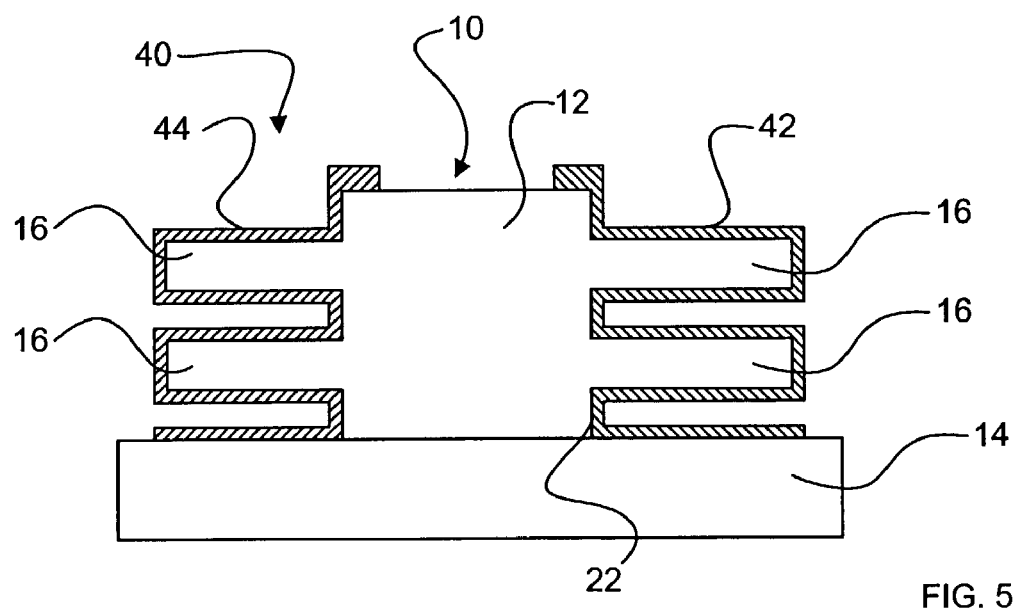
FIG. 5 is side view of an additional embodiment of a fuel cell of the invention that includes the electrolyte of FIG. 1.

FIG. 5 illustrates an additional invention embodiment in the form of the exemplary fuel cell 40. The cell 40 is similar to the cell 30 except that the anode 42 and cathode 44 are formed in a thin layer to generally match the surface of the electrolyte 10. The thickness of the anode 42 and cathode 44 may be as small as about 0.5 micron or less. This may be advantageous to provide a larger reactive surface area than the configuration of FIG. 4.

The anode 32 or 42 may be made of useful materials that are generally known in the art. By way of example, an exemplary anode material for SOFC applications is a ceramic/metal mixture ("cermet"), with particular examples including, but not limited to, yttria stabilized zirconia/nickel, samaria doped ceria/nickel, samaria doped ceria/copper, and the like, composite mixtures of catalytically active, electrically conducting, and ionic conducting ceramics can be considered as well. The cathode 34 or 44 may also be made of materials that are known to be useful in the art, with exemplary materials for SOFC applications including a composite mixture of an electrocatalyst and an oxygen ion conductor. Particular examples include, but are not limited to, lanthanum strontium maganite/yttria stabilized zirconia, lanthanum strontium cobaltite ferrite/samaria doped ceria, samarium strontium cobaltite/samaria doped ceria, and the like.

Figure 6:
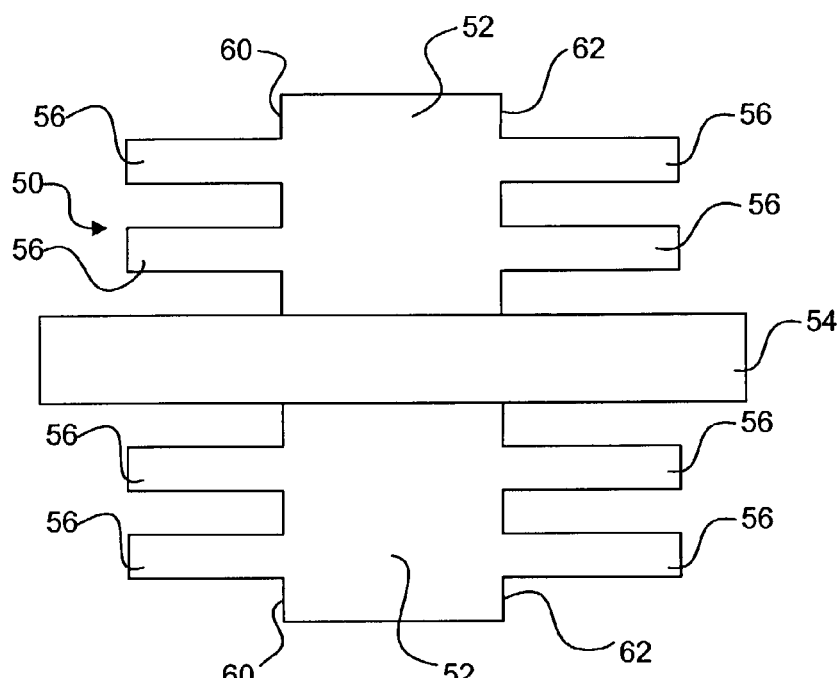
FIG. 6 is a side view of an additional embodiment of an electrolyte of the invention.

It will be appreciated that the present invention may be practiced using electrolytes and fuel cells of a variety of configurations and types. FIG. 6 illustrates an additional electrolyte embodiment shown generally at 50. Two generally vertical cores 52 are on opposite sides of a substrate 54. A plurality of projections 56 extends from opposite planar sides 60 and 62 of the cores 52. The substrate 54 is preferably an integral portion of the electrolyte 50.

Figure 7:
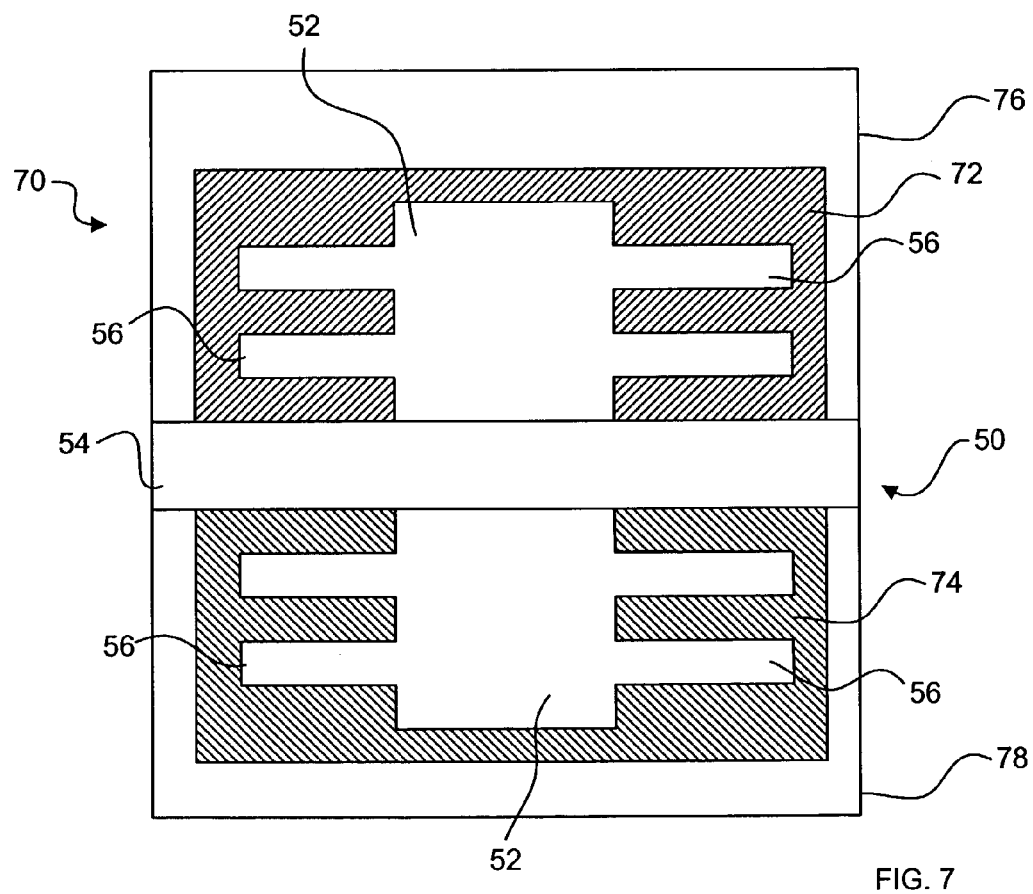
FIG. 7 is side view of an embodiment of a fuel cell of the invention that includes the electrolyte of FIG. 6.

FIG. 7 illustrates an additional fuel cell embodiment of the invention generally at 70 that includes the electrolyte 50. In the fuel cell 70, an anode 72 is attached to the core 52 and projections 56 on a first side of the substrate 50, while a cathode 74 is attached to the core 52 and projections 56 on the opposing second side of the substrate 50. Two enclosures 76 and 78 are also provided for enclosing the cathode 72 and anode 74, respectively. As will be appreciated by those knowledgeable in the art, the enclosures 76 and 78 may be used to contain fuel and/or oxidant gas for reaction with the anode 74 and/or cathode 72. Also, these enclosures 76 and 78 can contain porous anode 74 and cathode 72 materials. The enclosures 76 and 78 may comprise any enclosure that are generally known to be useful in the art, including, by way of example and not limitation, manifolds, chambers formed by walls, and the like.

Those skilled in the art will appreciate that individual fuel cells consisting of a single electrolyte, single cathode, and single anode may provide a relatively small current and voltage that will not be sufficient for many applications. For this and other reasons, individual fuel cells are often combined and electrically linked in series or parallel in order to provide a total current and voltage of a larger, more useful magnitude. Fuel cells of the present invention may be provided in such configurations.

Figure 8:
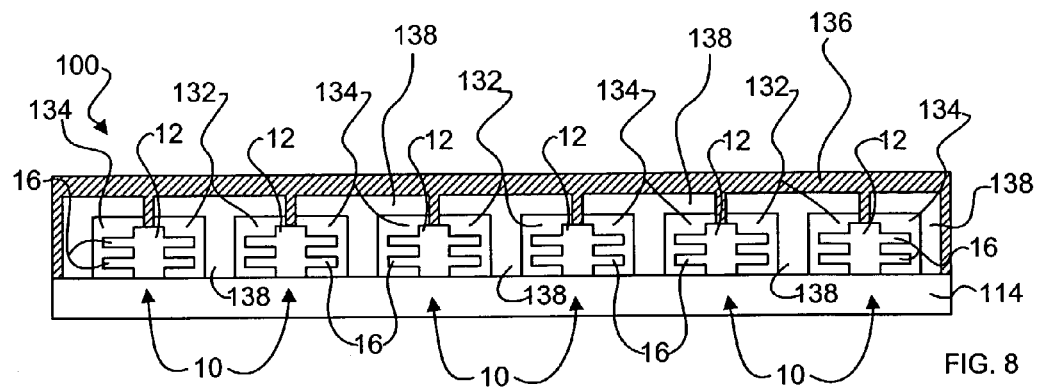
FIG. 8 is a side view of an embodiment of a fuel cell assembly of the invention.

FIG. 8, for instance, illustrates a fuel cell assembly of the invention shown generally at 100 that includes a plurality of individual electrolytes shown generally at 10 consistent with the electrolyte 10 of FIG. 1, and include a generally vertical core or core 12 supported on a substrate 114. Pluralities of projections 16 extend from opposite sides of each of the cores 12. An anode 132 is connected to one side of each of the cores 12 and the plurality of projections 16 extending from that side. A cathode 134 is connected to the opposite side of each of the cores 12 and to the plurality of projections 16 that extend from that side. A manifold 136 is provided to cover the substrate 114, the electrolytes 12, the pluralities of anodes 32, and the plurality of cathodes 34.

The manifold 136 also serves to define a plurality of channels 138. Each channel 138 has at least one port (not illustrated) for communicating gas to and from the channel. The anodes 132 and cathodes 134 are arranged such that each of the channels 138 contains only anodes 132 or only cathodes 134. That is, the anodes 312 are arranged in adjacent pairs, and the cathodes are arranged in adjacent pairs. Put another way, the fuel cell assembly 100 has two anodes 132 connected to adjacent of the electrolytes 10 being adjacent to one another, and likewise with two cathodes 134 connected to adjacent of electrolytes 10 being adjacent to one another. Each of the individual electrolytes 10 with their respective connected anodes 132 and cathodes 134 may be electrically linked by a current collector (not illustrated) in series or parallel.

Figure 9:
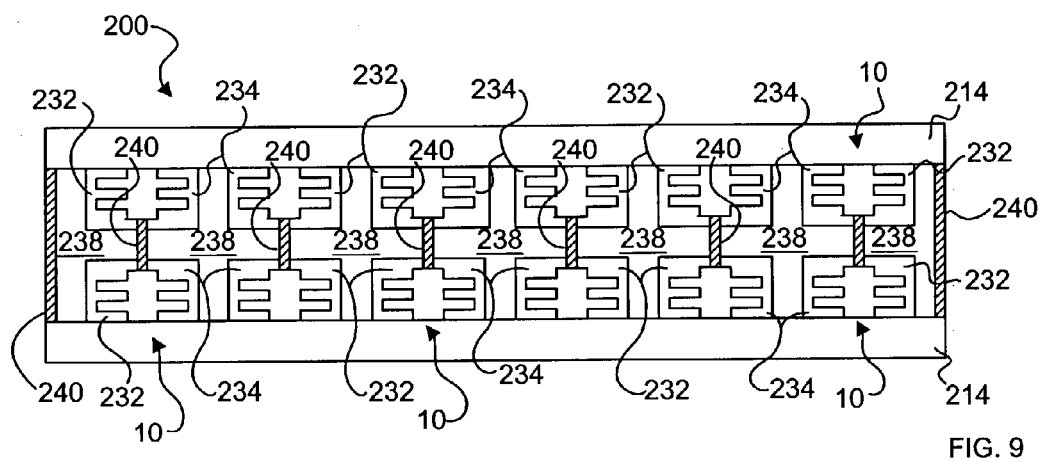
FIG. 9 is a side view of an additional embodiment of a fuel cell assembly of the invention.

It will be appreciated that many additional configurations of electrolytes and fuel cells of the present invention will also offer advantages. The fuel cell assembly shown generally at 200 in FIG. 9, for example, has a plurality of channels 238 that each have up to four anodes 232 or cathodes 234 therein. The anodes 232 and cathodes 234 are connected to opposing sides of electrolytes 10 that are consistent with the electrolytes 10 of FIG. 1 and include a core as well as a plurality of projections that extend from the core. As illustrated, the channels 238 are defined by walls 240 that extend between the two opposing substrates 214, with some of the walls 240 received on electrolytes 10 and the two end walls that are received on the substrates 214.

The anodes 232 and cathodes 234 are arranged so that each channel 238 contains only anodes 232 or cathodes 234. Put another way, anodes 232 are connected to the first side of a first electrolyte 10, and to the second side of the adjacent electrolyte 10 on each of the substrates 214 so that the anodes 232 connected to sequential electrolytes 10 are adjacent to one another. Cathodes 234 are arranged in a similar manner, so that cathodes 234 from sequential electrolytes 10 on each substrate 214 are adjacent to one another.

Figure 10:
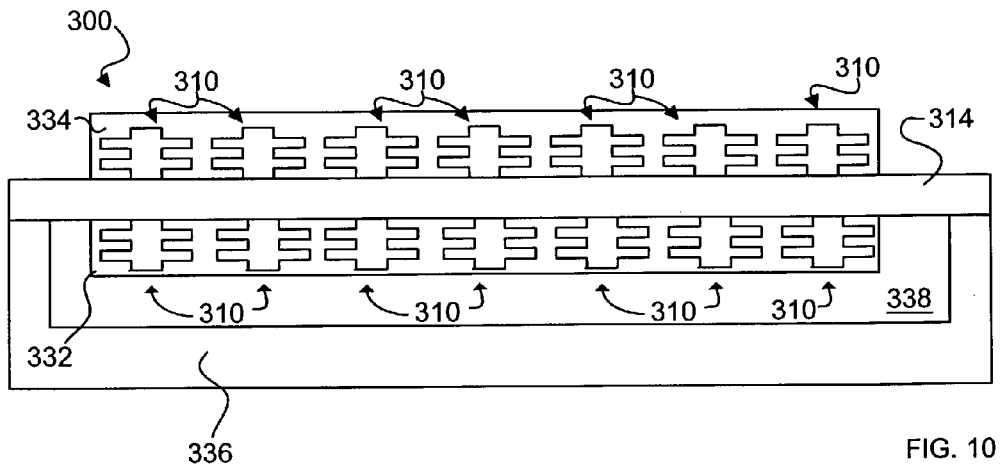
FIG. 10 is a side view of an additional embodiment of a fuel cell assembly of the invention.

FIG. 10 illustrates still another fuel cell configuration of the invention. The fuel cell shown generally at 300 comprises a substrate 314 with a plurality of individual electrolyte formations 310 supported on each of its top and bottom opposing sides. Each of the electrolyte formations 310 are consistent with the electrolytes 10 of FIG. 1 and include a core or core as well as a plurality of projections or projections that extends from the core. The substrate 314 is made of the same material as the electrolyte formations 310, and is preferably integrally connected thereto to form a part of the electrolyte. Accordingly, the electrolyte formations 310 on each of the opposing sides of the substrate 314 are electrically linked, and the formations 310 and the substrate 314 collectively form a functional single electrolyte.

An anode 332 is connected to the plurality of electrolyte formations 310 on one of the substrate's opposing sides, and a cathode 334 connected to the plurality of formations 310 on the other of the opposing sides. The anode 332 and cathode 334 thereby strongly anchored to the electrolyte 314 through the plurality of formations 310. A manifold 336 is connected to one side of the electrolyte substrate 314 to define a channel 338 through which gas may be communicated using at least one port (not illustrated). It will be appreciated that an additional manifold could be provided to define a channel for containing the cathode 334. It will also be appreciated that other fuel cell embodiments of the invention may include a plurality of fuel cells 300 that are electrically linked to one another in series or parallel.

Figure 11:
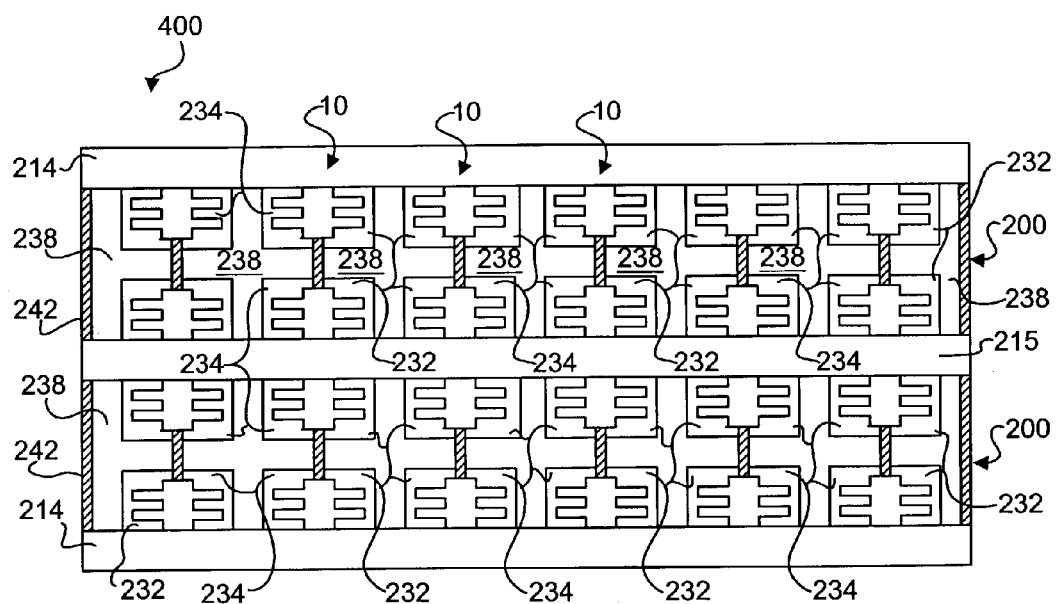
FIG. 11 is a side view of an additional embodiment of a fuel cell assembly of the invention.

It will likewise be appreciated that other fuel cell and fuel cell assembly embodiments of the invention discussed herein may be combined in series, parallel, or in other ways. For example, FIG. 11 illustrates a fuel cell assembly 400 that generally comprises two of the assemblies 200 of FIG. 9 stacked on one another. A substrate 215 separates the two assemblies 200 from one another, and supports electrolytes 110 on both of its upper and lower sides. The substrate 215 may contain two of the substrates 214 layered on one another, or may be a single substrate layer. The anodes 232 and cathodes 234 from each of the cell assemblies 200 may be linked in series or parallel to deliver a current that represents a cumulative total from all of the assemblies 200. It will be appreciated that while only two fuel cell assemblies 200 have been illustrated, any desired number of fuel cell assemblies 200 could be stacked. Such configurations offer the advantage of a relatively high power output while requiring only a relatively small footprint.

Figure 12:
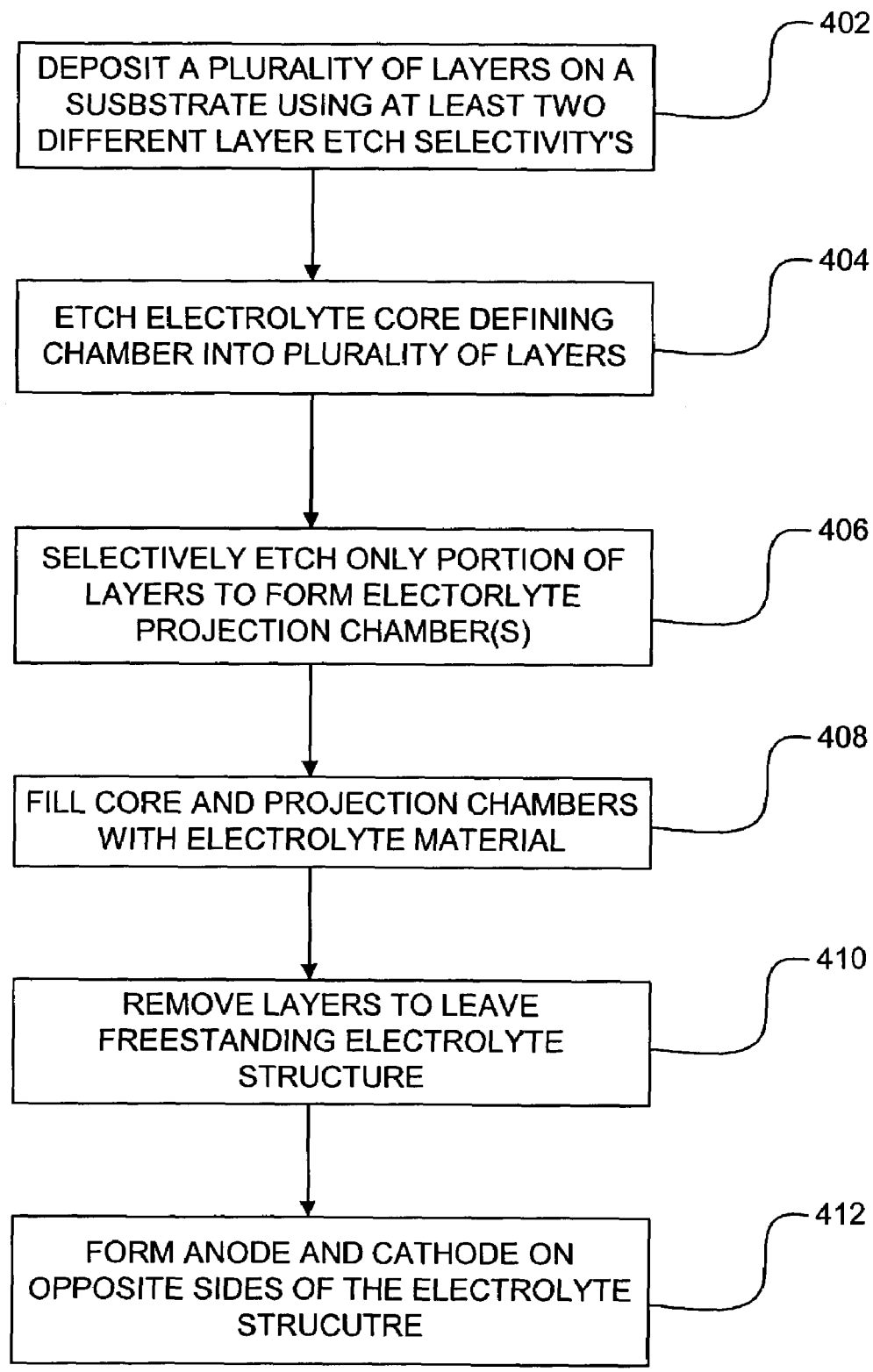
FIG. 12 is a flow chart illustrating an embodiment of a method of the invention.

In addition to electrolytes and fuel cells, the present invention is also directed to methods for making an electrolyte, and to methods for making fuel cells. FIG. 12 is a flowchart illustrating an embodiment of a method of the invention for making an electrolyte of the invention. In an initial step, a plurality of layers is deposited on a substrate, with at least two of the layers having different etch selectivity's (block 402). The layers may be made of any of a variety of suitable materials that are generally known in the art, with examples including, but not limited to, silicon, oxides of silicon, poly-silicon, doped silicon, spin on glass, etc. The layers may be deposited using deposition methods generally known in the art, including but not limited to vapor deposition, sputtering, and the like. Preferably, the at least two of the layers that have different etch selectivity's are made of different materials. It will be appreciated, however, that layers made of the same material may have different etch selectivity's. For example, two layers made of the same material but having different particle sizes may have different etch selectivity's.

A first chamber defining the electrolyte core is then defined in the plurality of layers through anisotropic etching of the layers (block 404). Those skilled in the art will appreciate that other removal methods in addition to etching are known for defining a chamber in the layers and will be useful for practice of the invention. In defining the core chamber, a portion of each of the two layers made of different materials is removed. Preferably, a portion of each of the plurality of layers is removed. An etching or other removal procedure is accordingly used that is effective for operating on both of the two different materials, or with each of the different etch selectivity's.

In a subsequent step, at least one additional chamber is defined from a portion of only one or more selected of the plurality of layers to define at least one electrolyte projection (block 406). This step may be accomplished by using an etching or other removal technique that only selected of the plurality of layers are responsive to, or by using etching that some of the layers are more responsive to than others. For example, if two layers A and B each have different etch selectivity's, an etching technique may be used that will affect only layers made of B, or alternatively that will affect B at a higher rate than A so as to etch away substantially larger portions of B than of A. Preferably a plurality of projection chambers is formed.

After these steps of defining the core and projection chambers, a pattern exists in the plurality of layers that defines the electrolyte. This electrolyte-defining chamber is then filled with electrolyte material (block 408). Filling the pattern may be accomplished using techniques generally known in the art, such as vapor deposition, sputtering, and the like. Also, a variety of materials are appropriate for use as the electrolyte material, with exemplary materials including the ceramics discussed with reference to electrolyte embodiments of the invention.

The remaining portions of the plurality of layers are then removed to leave a freestanding electrolyte structure on the substrate (block 410). By way of example, the freestanding electrolyte built through the steps of this method embodiment may be consistent with the electrolyte 10 shown in FIG. 1. To make a fuel cell that incorporates the electrolyte, a subsequent step of forming an anode and a cathode on the electrolyte is performed (block 412). The anode is preferably formed on one side of the electrolyte structure and the cathode on the other with the two separated from one another. Each of the anode and the cathode preferably are connected to a plurality of the projections extending from the electrolyte core. An exemplary fuel cell built through these steps may be generally consistent with the fuel cell 30 of FIG. 4.

Figure 13:
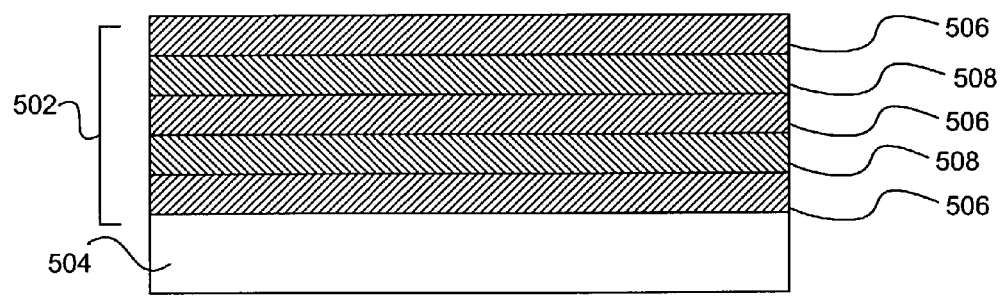
FIGS. 13(a)–13(g) illustrate various stages of formation of an embodiment of a fuel cell of the invention.
Figure 13:
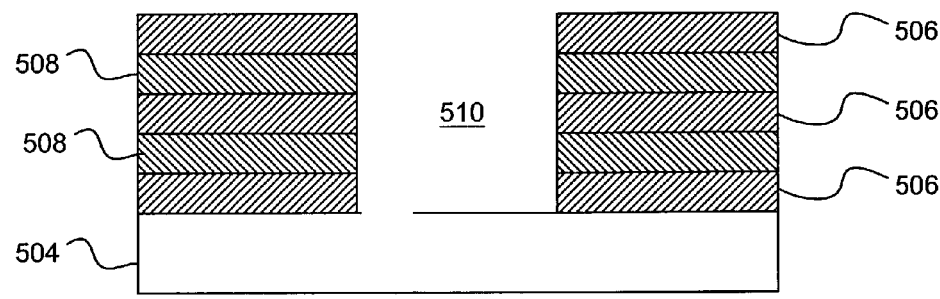
Figure 13:
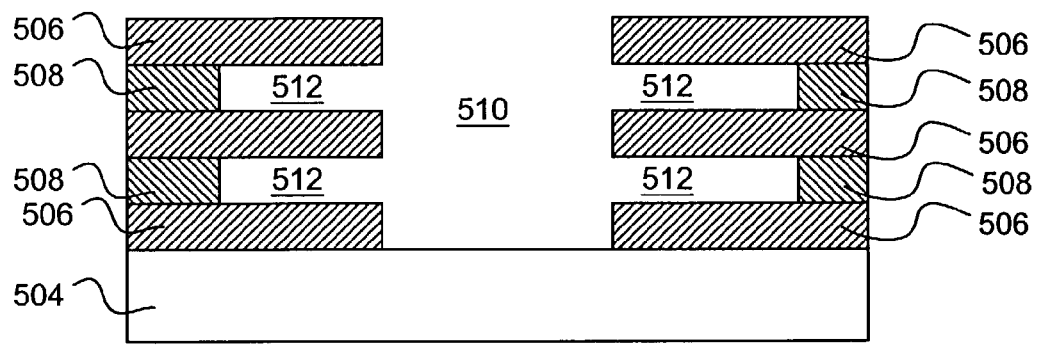
Figure 13:
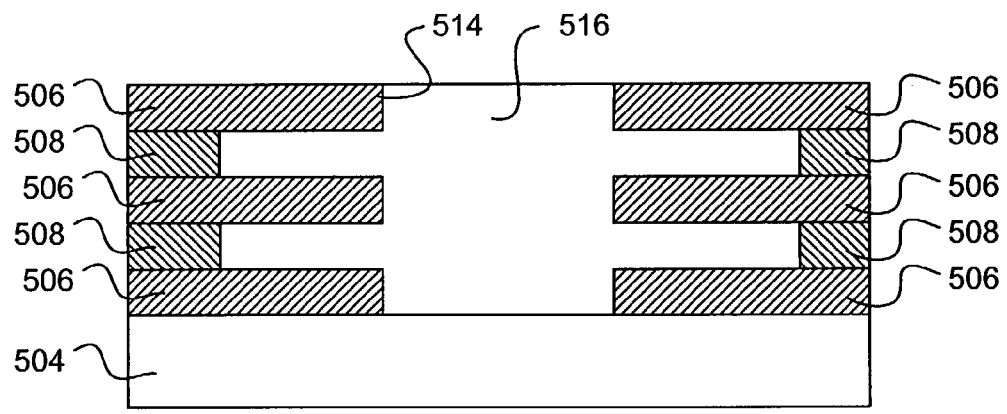
Figure 13:
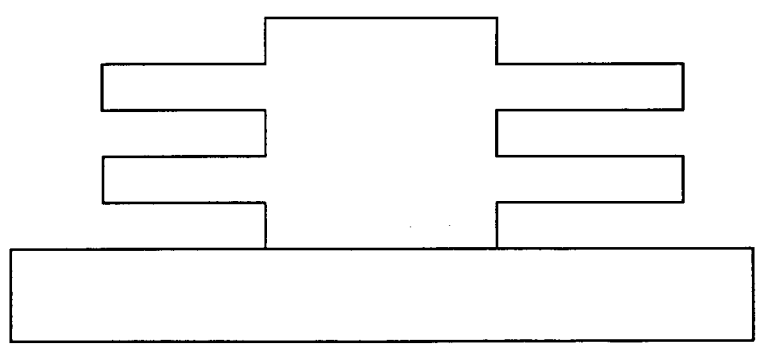

Embodiments of the present invention directed to methods for making electrolytes and fuel cells of the invention may be further illustrated by consideration of FIGS. 13(*a*)–13(*g*). FIG. 13(*a*) illustrates a plurality of layers 502 that have been deposited on a substrate 504. The plurality of layers 502 comprises at least two individual layers 506 and 508 that have different etch selectivity's. That is, at least a first layer 506 has a first etch selectivity, and at least a second layer 508 has a second etch selectivity. Preferably, the two layers 506 and 508 are made of different materials from one another. The first and second materials are preferably distinct from one another in their resistance to a particular technique of removal, such as etching. Those skilled in the art will appreciate that a wide variety of materials will be suitable as either the first or second material in practice of the invention. For example, a first material may be silicon, which may be readily removed through steps of an isotropic $SF_6$ etch, while a second material may be $SiO_2$, which is resistant to removal through an isotropic $SF_6$ etch.

After the plurality of layers 502 has been deposited, a portion of them are removed through etching or through other steps to form a chamber 510, as is illustrated by FIG. 13(*b*). That is, a portion of each of the layers 506 and 508 has been removed to form the chamber 510. The chamber 510 will define the electrolyte core, and may thus be referred to as a core chamber. The removal of both layers may be achieved by a removal process that effects both layers, or may be achieved by a plurality of removal steps of one layer and then the next using different techniques as may be required for the particular layer.

In a subsequent removal step, portions of only the layers 508 are removed to form a plurality of projection chambers 512, as is illustrated by FIG. 13(*c*). The removal process for defining these projection chambers is preferably a technique that is not effective in removing an appreciable amount of the layers 506. Each of the projection chambers 512 will define one of the plurality of projections of the electrolyte. It will be appreciated that in this second etching step, some small portion of the first layers 506 may be removed. The amount removed, however, will be small in comparison to the portions of the layers 508 removed. Preferably, substantially no portion of the layers 506 is removed.

In combination, the chambers 510 and 512 define a pattern 514 for the electrolyte consisting of the core and plurality of projections. The electrolyte may then be formed by filling this pattern 514 with electrolyte material 516, as is illustrated by FIG. 13(*d*). Techniques such as vapor deposition, sputtering, and the like may be used to fill the pattern. After the electrolyte material 516 has hardened in the pattern 514, the remaining portions of the layers 506 and 508 are removed to leave the freestanding electrolyte 518 illustrated in FIG. 13(*e*). It will be appreciated in consideration of FIG. 13 that other steps may also be provided, such as for example forming a current collector, forming a structural connector, or the like.

Those skilled in the art will also appreciate that other method embodiments of the invention may be practiced to create electrolytes and/or fuel cells in other configurations. By way of example, it will be apparent that embodiments of the method of the invention could be practiced to create any of the electrolyte or fuel cell embodiments that have been discussed herein and illustrated in FIGS. 1–11.

Figure 14:
FIGS. 14(a)–14(k) illustrate various stages of formation of an additional embodiment of a fuel cell of the invention.
Figure 14:
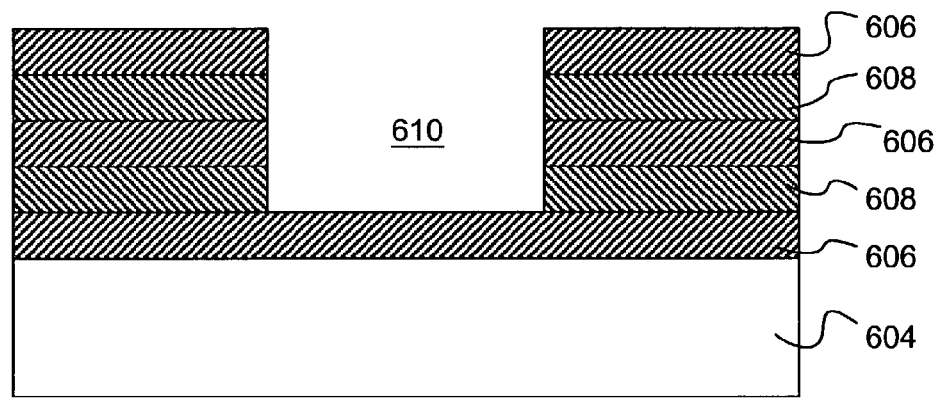
Figure 14:
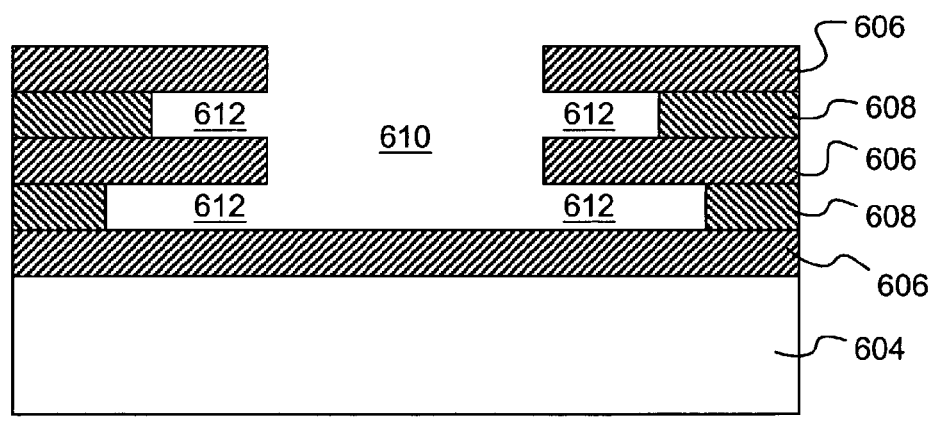
Figure 14:
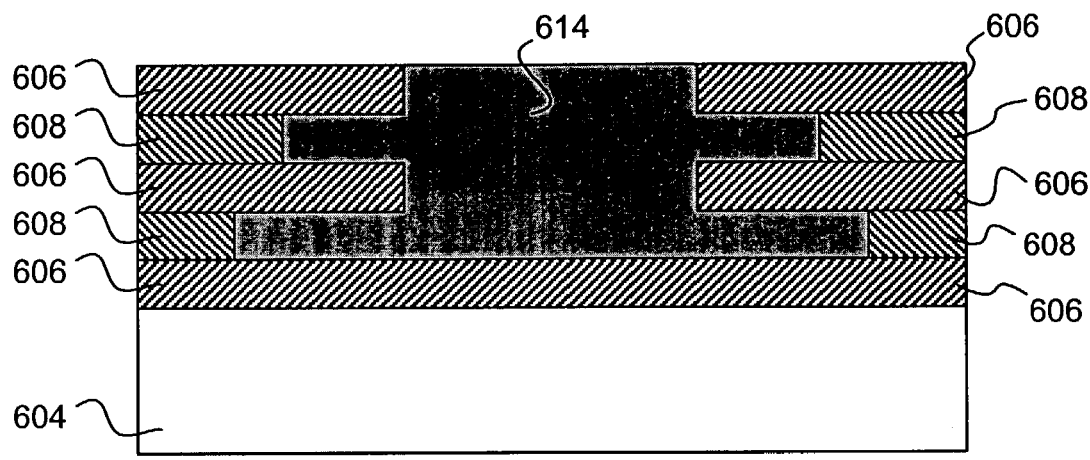
Figure 14:
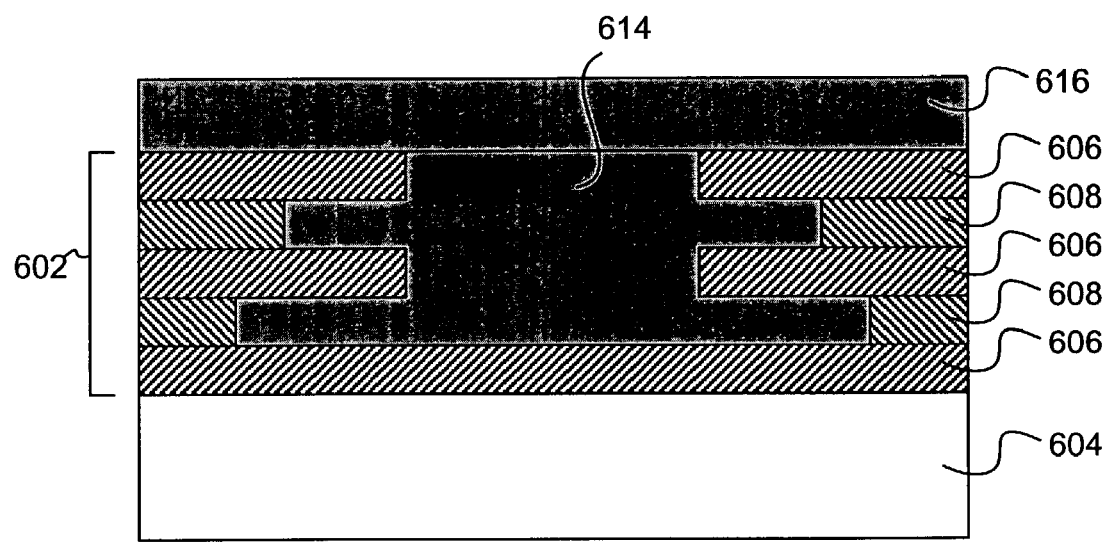
Figure 14:
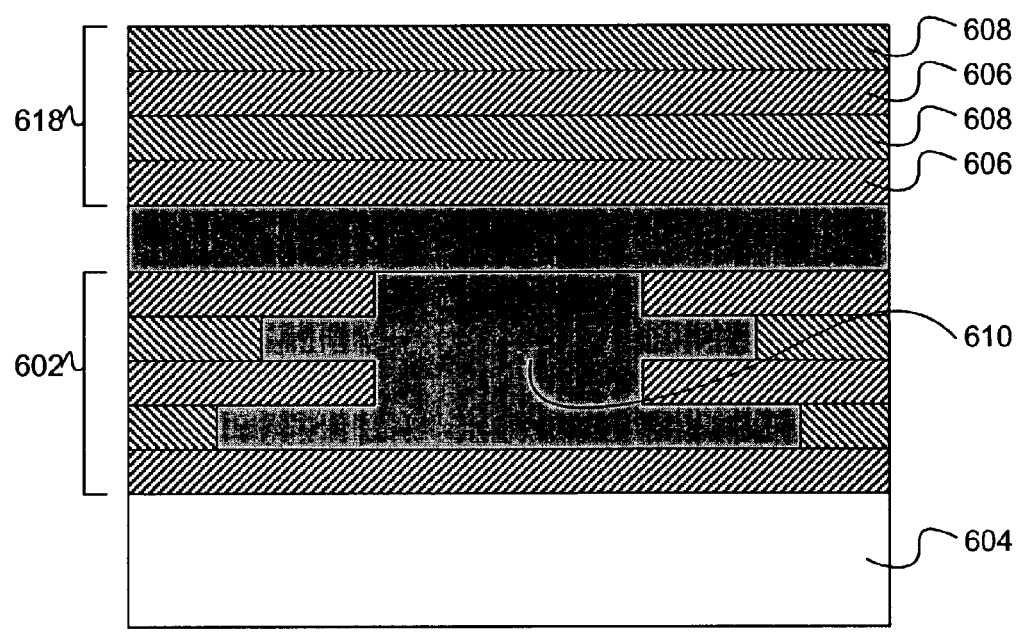
Figure 14:
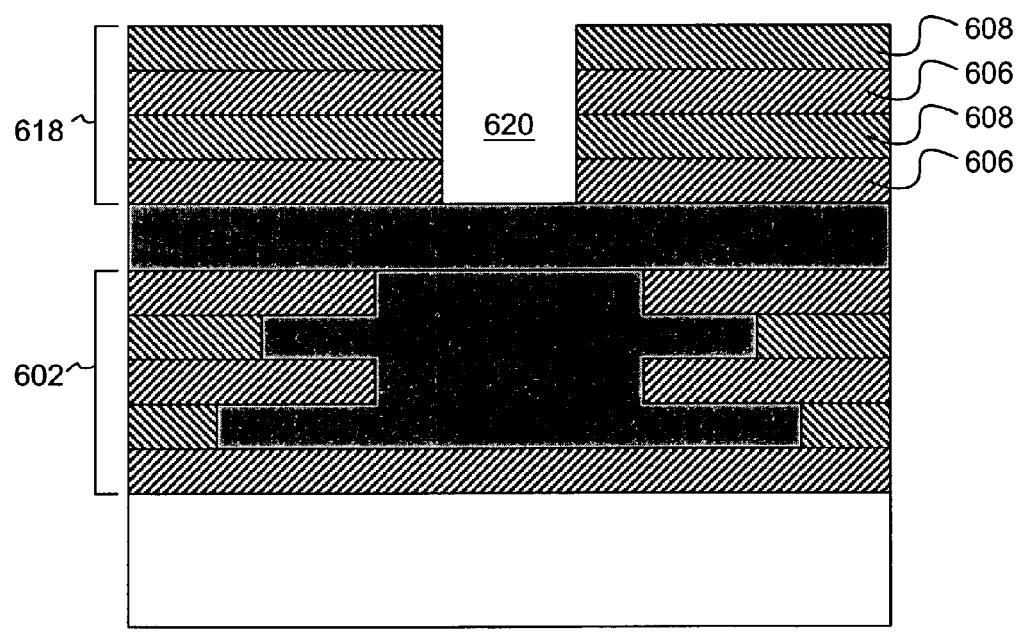
Figure 14:
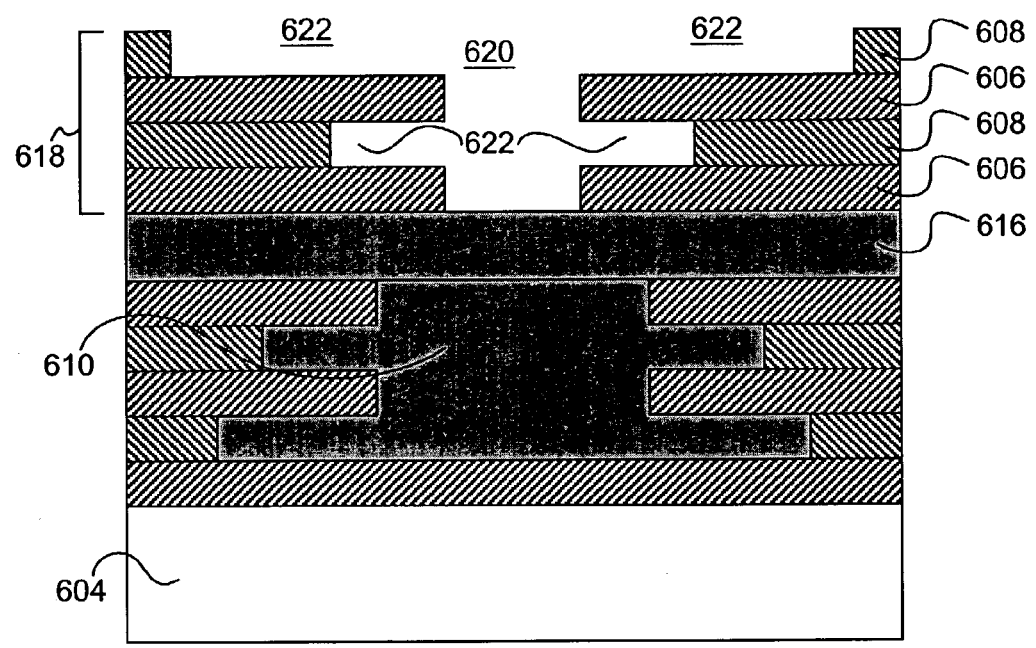
Figure 14:
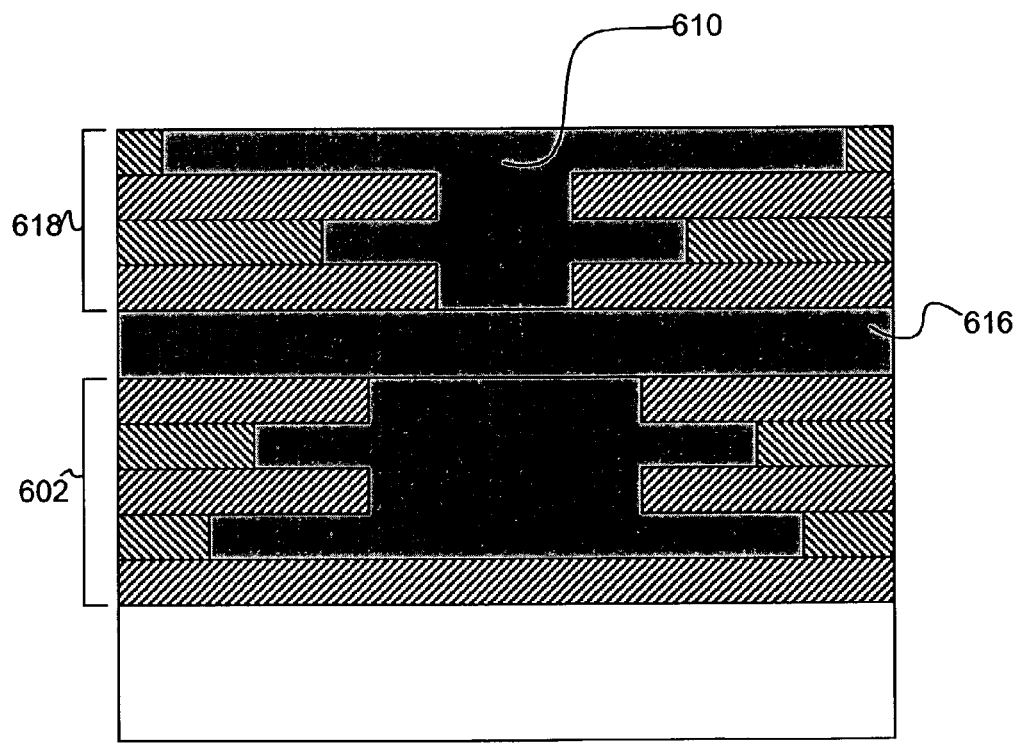
Figure 14:
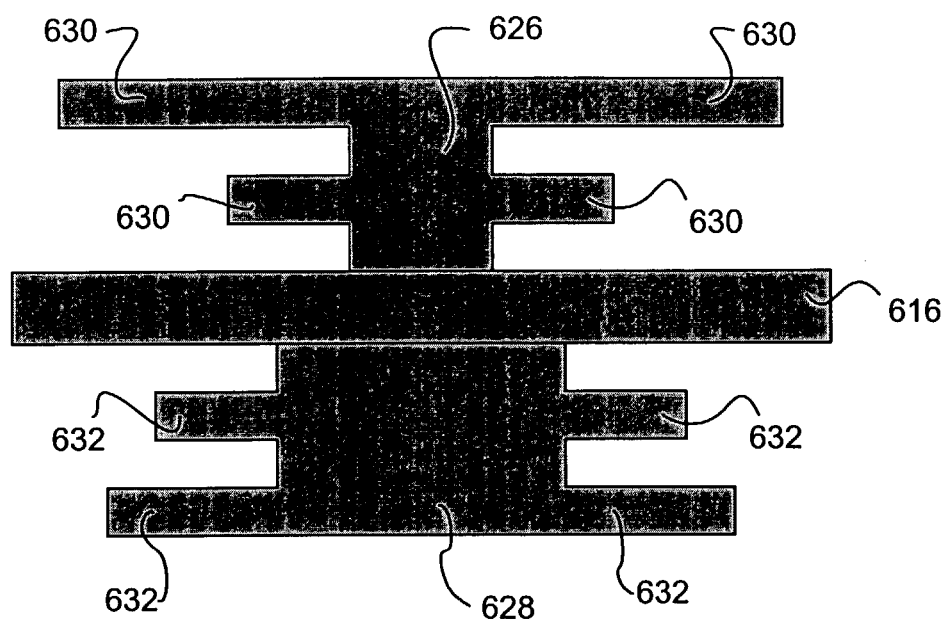
Figure 14:
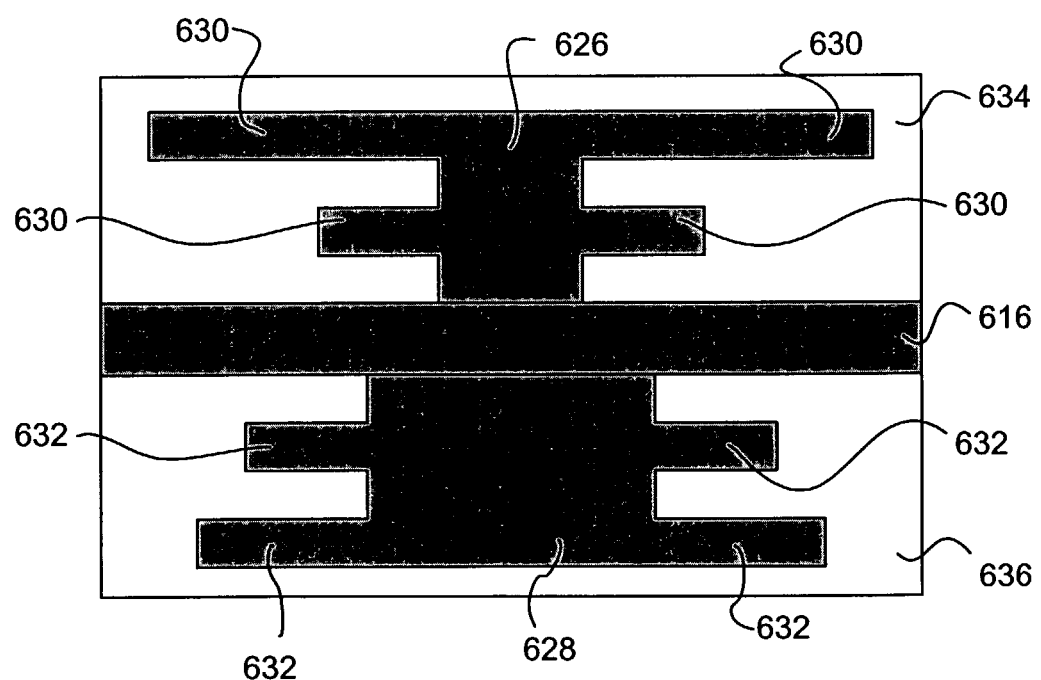

By way of particular example, FIG. 14 is useful in illustrating an additional embodiment of a method of the invention that is useful for making another electrolyte embodiment of the invention. In FIG. 14(a), a plurality of layers 602 has been deposited on a substrate 604. The plurality of layers 602 are made up of a plurality of first layers 606 having a first etch selectivity and a plurality of second layers 608 having a second etch selectivity. Portions of both the layers 606 and 608 are etched or otherwise removed to define a core chamber 610 as illustrated by FIG. 14(b). Portions of only the first layer material 606 are removed in a subsequent step to define a plurality of projection chambers 612, as illustrated in FIG. 14(c). The portions removed are of different sizes to create projections of different sizes.

The core and projection chambers 610 and 612, respectively, are then filled with electrolyte material 614, as illustrated in FIG. 14(d). In FIG. 14(e), an electrolyte substrate 616 is deposited on top of the filled core chamber 610 and remaining portions of the uppermost plurality of layers 602. The electrolyte substrate 616 is preferably of the same chemical composition as the electrolyte material 610. FIG. 14(f) shows the result of depositing an additional plurality of layers 618 on top of the electrolyte substrate 616. Like the plurality of layers 602, the additional plurality of layers 618 are made up of a plurality of the first layers 606 and a plurality of the second layers 608. A second core chamber 620 is then defined in the plurality of layers 618 by removing a portion of each of the first layers 606 and the second layers 608, as is illustrated by FIG. 14(g). As illustrated, the second core chamber 620 may be of a different size or geometry than the first core chamber 610.

A plurality of projection chambers 622 is then defined by removing only portions of the second layers 608 as shown by FIG. 14(h). The core chamber 618 and the projection chambers 622 are then filled with electrolyte material 610 as illustrated by FIG. 14(i). Removal of the remaining portions of all of the first layers 606 and second layers 608 from both the plurality of layers 618 and 602 leaves the electrolyte structure 624 shown in FIG. 14(j). It is noted that the electrolyte structure 624 has an upper side core 626 and lower side core 628 of different sizes on opposite sides of the substrate 616, and has upper side projections 630 and lower side projections 632 that are not of uniform size. Preferably, the total surface area of the upper side electrolyte core 626 and projections 630 is substantially the same as the total surface area of the lower side core 628 and projections 632.

FIG. 14(k) shows an anode 634 and a cathode 636 that have been attached to the electrolyte cores 626 and 628 and projections 630 and 632 respectively, to make a fuel cell. The anode 634 and cathode 636 are separated from one another. Those skilled in the art will appreciate that other generally known fuel cell components may additionally be provided, including for example a current collector and one or more enclosures for communicating gas to one or more of the anode 634 and cathode 636.

Figure 15:
FIGS. 15(a)–(b) illustrate various stages of formation of an embodiment of an electrolyte structure of the invention.
Figure 15:
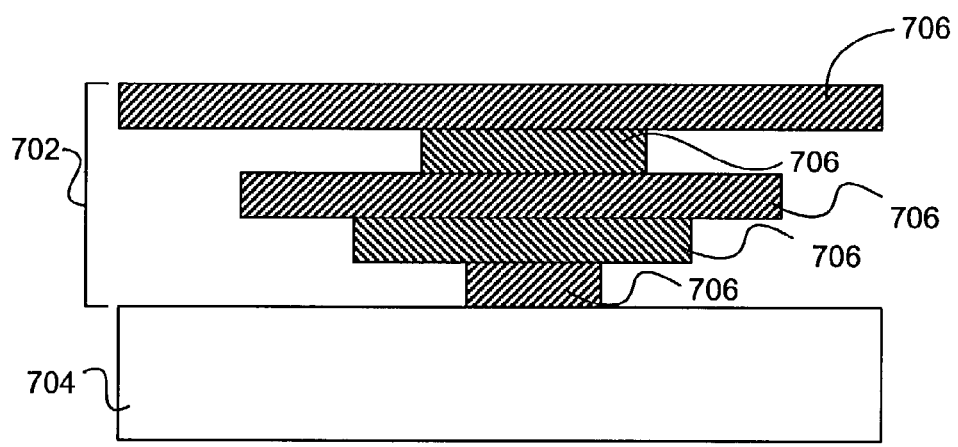

In still an additional method embodiment for forming an electrolyte core of the invention, an electrolyte structure is formed on a substrate and then etched to form an electrolyte structure having at least one projection. FIG. 15 is useful in illustrating this method. FIG. 15(a) shows an electrolyte structure 702 formed on a substrate 704, with the structure 702 made up of a plurality of individual layers 706. At least two of the layers 706 have different etch selectivity's. Those knowledgeable in the art will appreciate that etch selectivity's may be controlled through a variety of means, with grain sizes and choice of binder being two examples. When the structure 712 is exposed to an etching process, the different etch selectivity's of the layers 716 will cause etching to proceed to a different extent on the different layers, with an exemplary result shown in FIG. 15(b) having a plurality of projections extending from the electrolyte core.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. Various features of the invention are set forth in the appended claims.

The invention claimed is:

1. A method for making at least one freestanding electrolyte for use with a thin film fuel cell comprising the steps of:
   forming a first structure on a substrate;
   forming at least one chamber in said first structure, said at least one chamber defining a core and at least one projection extending from said core;
   filling said at least one chamber with electrolyte material; and
   removing said first structure to expose a freestanding electrolyte having a core and at least one projection extending therefrom, said at least one projection separated from said substrate.

2. A method for making at least one freestanding electrolyte as defined by claim 1 wherein the step of forming said at least one chamber comprises a first step of forming a core portion of said chamber and a second step of forming at least one projection portion of said chamber.

3. A method for making at least one freestanding electrolyte as defined by claim 1 wherein the step of forming said first structure comprises forming at least a first layer and a second layer on said substrate, each of said first and said second layers having different etch selectivity's.

4. A method for making at least one freestanding electrolyte as defined by claim 3 wherein said first layer is made of a first material and said second layer is made of a second material.

5. A method for making at least one freestanding electrolyte as defined by claim 3 wherein the step of forming said chamber comprises at least a first step of removing at least a part of said at least a first layer and at least a part of said at least a second layer, and a second step of removing a second portion of said structure, said second portion including one or more parts of said second layer but substantially no portion of said first layer.

6. A method for making at least one freestanding electrolyte as defined by claim 1 wherein the step of forming said structure comprises depositing a plurality of layers on said substrate, and wherein the step of forming said chamber comprises one or more steps of etching said plurality of layers to form a pattern.

7. A method for making at least one freestanding electrolyte as defined by claim 6 wherein at least a first of said plurality of layers has a first etch selectivity and at least a second of said plurality of layers has a second etch selectivity, and wherein the step of etching said pattern into said plurality of layers comprises a first step of etching a core portion of said at least one chamber from said first and said second layers, and a second step of etching a plurality of projection portions of said chamber through etching a portion of said second layer but not said first layer.

8. A method for making at least one freestanding electrolyte as defined by claim 1 wherein said substrate is made of said electrolyte material.

9. A method for making a fuel cell comprising the method of making at least one freestanding electrolyte as defined by claim 1, and further comprising the steps of:
- forming a cathode in contact with a first portion of said freestanding electrolyte; and,
- forming an anode in contact with a second portion of said freestanding electrolyte, said anode separated from said cathode.

10. A method for making a fuel cell as defined by claim 9 wherein the method further comprises the step of providing at least one enclosure for containing the fuel cell.

11. A method for making at least one freestanding electrolyte as defined by claim 1 wherein said chamber defines a plurality of projections extending from said core, and wherein said at least one freestanding electrolyte has a plurality of projections extending therefrom.

12. A method for making at least one freestanding electrolyte as defined by claim 1 wherein said at least one chamber comprises a plurality of chambers, and wherein said at least one freestanding electrolyte comprises a plurality of freestanding electrolytes.

13. A method for making a plurality of freestanding electrolytes as defined by claim 12 wherein each of said plurality of chambers are substantially identical and have a first side with a first plurality of projections extending therefrom and an opposite second side with a second plurality of projections extending therefrom.

14. A method for making at least one freestanding electrolyte as defined by claim 1 wherein said substrate has opposing first and second sides, said at least a first structure formed on said first side, and the method further comprises the steps of:
- forming a second structure on said second side of said substrate;
- forming at least one chamber in said second structure, said at least one chamber defining a core and at least one projection extending from said core;
- filling said at least one chamber on said substrate second side with electrolyte; and
- removing said second structure to leave at least one freestanding electrolyte having a core and at least one projection extending therefrom on said substrate second side, said at least one projection separated from said substrate second side.

15. A method for making at least one freestanding electrolyte as defined by claim 1 wherein the method further comprises the steps of:
- depositing an electrolyte substrate layer on top of said chamber filled with said electrolyte material and said structure;
- forming a second structure on top of said electrolyte layer;
- defining a second chamber in said second structure, said second chamber defining a core chamber and at least one projection chamber;
- filling said second chamber with said electrolyte material; and
- removing said second structure to expose a free standing electrolyte on said electrolyte substrate layer, said free standing electrolyte having a core and at least one projection extending therefrom, said at least one projection separated from said electrolyte substrate layer.

16. A method for making at least one freestanding electrolyte material as defined by claim 15 wherein said first chamber and said second chamber are substantially identical.

17. A method for making a freestanding electrolyte structure comprising the steps of:
- forming an electrolyte structure on a substrate; and
- etching said electrolyte structure to define a core and at least one projection extending from said core and separated from said substrate.

18. A method for making a freestanding electrolyte structure as defined by claim 17 wherein the step of forming said electrolyte structure comprises forming a plurality of layers on said substrate, at least two of said layers having different etch selectivity's.

* * * * *